(12) United States Patent
Gladfelter et al.

(10) Patent No.: US 7,078,615 B2
(45) Date of Patent: Jul. 18, 2006

(54) CABLE GUIDE SLEEVING STRUCTURE

(75) Inventors: Harry F. Gladfelter, Kimberton, PA (US); Paul J. Matte, Chester Springs, PA (US); Patrick M. Pendergast, Malvern, PA (US); Dawn D. Ross, West Chester, PA (US)

(73) Assignee: TVC Communications, L.L.C., Annville, PA (US)

( * ) Notice: Subject to any disclaimer, the term of this patent is extended or adjusted under 35 U.S.C. 154(b) by 228 days.

(21) Appl. No.: 10/650,429

(22) Filed: Aug. 28, 2003

(65) Prior Publication Data

US 2004/0081411 A1    Apr. 29, 2004

Related U.S. Application Data

(60) Provisional application No. 60/406,607, filed on Aug. 28, 2002, provisional application No. 60/476,939, filed on Jun. 9, 2003.

(51) Int. Cl.
*H01B 7/34* (2006.01)

(52) U.S. Cl. ........................................ 174/36

(58) Field of Classification Search ............... 174/36, 174/110 R, 19, 74 R, 82; 428/36.1, 36.3, 428/100, 192–193, 36.9, 34.1–34.5; 57/210, 57/243; 87/29.6; 139/383 R, 404–409
See application file for complete search history.

(56) References Cited

U.S. PATENT DOCUMENTS

| 2,585,054 | A | 2/1952 | Statchura ................ 174/36 |
| 3,939,875 | A | 2/1976 | Osborn et al. ............. 138/178 |
| 4,478,661 | A | 10/1984 | Lewis ........................ 156/92 |
| 4,582,093 | A | 4/1986 | Hubbard et al. ........... 138/111 |
| 4,639,545 | A | 1/1987 | Pithouse et al. |
| 4,668,545 | A | 5/1987 | Lowe |
| 4,674,167 | A | 6/1987 | Hubbard et al. ........... 29/401.1 |
| 4,684,762 | A | 8/1987 | Gladfelter ................... 174/36 |
| 4,741,593 | A | 5/1988 | Fochler ................... 350/96.23 |
| 4,754,685 | A | 7/1988 | Kite et al. .................... 87/9 |
| 4,862,922 | A | 9/1989 | Kite, III ................... 138/119 |

(Continued)

FOREIGN PATENT DOCUMENTS

FR    2 492 603    4/1982

(Continued)

OTHER PUBLICATIONS

Carlon® Flexible Raceway Systems brochure, 16 pages, dated 2001.

(Continued)

*Primary Examiner*—William H. Mayo, III
(74) *Attorney, Agent, or Firm*—Renner, Kenner, Greive, Bobak, Taylor & Weber

(57) ABSTRACT

An elongated sleeve structure for insertion and protection of elongated items within a duct is disclosed. The sleeve structure is formed from a flexible sleeve woven from warp and fill yarns to produce opposed layers in closely spaced relation. The layers have a common seamless edge and are joined along a second edge by a knit stitch formed by interlooping of successive traverses of the fill yarn which is common to both layers. The layers are of equal width and are resiliently separable into a spaced apart relationship defining a central space which accommodates the elongated items. A pull tape is positioned between the opposed layers for drawing the elongated items through the sleeve central space once the sleeve structure is positioned within the duct. Multiple sleeve structures may be joined together in an assembly using an attachment piece allowing a plurality of sleeve structures to be pulled simultaneously.

71 Claims, 8 Drawing Sheets

U.S. PATENT DOCUMENTS

| | | | |
|---|---|---|---|
| 4,891,256 A | 1/1990 | Kite, III et al. | 428/36.1 |
| 4,946,722 A | 8/1990 | Moyer | 428/36.1 |
| 4,989,422 A | 2/1991 | Barlow et al. | 66/170 |
| 5,023,395 A | 6/1991 | O'Connor | |
| 5,027,864 A | 7/1991 | Conti et al. | 138/177 |
| 5,029,815 A | 7/1991 | Kumpf | 254/134.3 |
| 5,053,582 A | 10/1991 | Terakawa et al. | |
| 5,074,527 A | 12/1991 | Kumpf | 254/134.3 |
| 5,178,923 A | 1/1993 | Andrieu et al. | 428/36.1 |
| 5,234,198 A | 8/1993 | Hale et al. | 254/134.4 |
| 5,289,556 A | 2/1994 | Rawlyk et al. | 385/112 |
| 5,300,337 A | 4/1994 | Andrieu et al. | 428/36.1 |
| 5,367,123 A | 11/1994 | Plummer, III et al. | |
| 5,413,149 A | 5/1995 | Ford et al. | 138/123 |
| 5,480,203 A | 1/1996 | Favalora et al. | 294/86.42 |
| 5,556,495 A | 9/1996 | Ford et al. | 156/148 |
| 5,587,115 A | 12/1996 | Allen | 264/1.24 |
| 5,613,522 A | 3/1997 | Ford et al. | 138/123 |
| 5,822,485 A | 10/1998 | Nelson et al. | 385/112 |
| 5,969,295 A | 10/1999 | Boucino et al. | 174/113 C |
| 6,066,800 A | 5/2000 | Renaud | |
| 6,240,968 B1 | 6/2001 | Bigonzi-Jaker et al. | 138/115 |
| 6,251,201 B1 | 6/2001 | Allen | 156/47 |
| 6,262,371 B1 | 7/2001 | Allen | 174/68.1 |
| 6,304,698 B1 | 10/2001 | Morris | 385/100 |
| 6,398,190 B1 | 6/2002 | Li | 254/134.4 |
| 6,421,485 B1 | 7/2002 | Morris | 385/100 |

FOREIGN PATENT DOCUMENTS

| | | |
|---|---|---|
| FR | 207 093 | 6/2002 |
| GB | 2 250 385 | 6/1992 |
| JP | 59-189507 | 10/1984 |
| JP | 61-141918 | 9/1986 |
| JP | 62-51913 | 3/1987 |
| JP | 2-37516 | 3/1990 |
| JP | 07-274336 | 10/1995 |

OTHER PUBLICATIONS

Douglas Material Specification Qualified Product List, DMS OPL 2379, Issue No. 2, dated Mar. 13, 1996, 13 pages.

Douglas Material Specification, DMS 2379A, dated Mar. 13, 1996, 7 pages.

EXPANDO® Self-Fitting Protective Oversleeve by BentleyHarris, 6 pages brochure, undated.

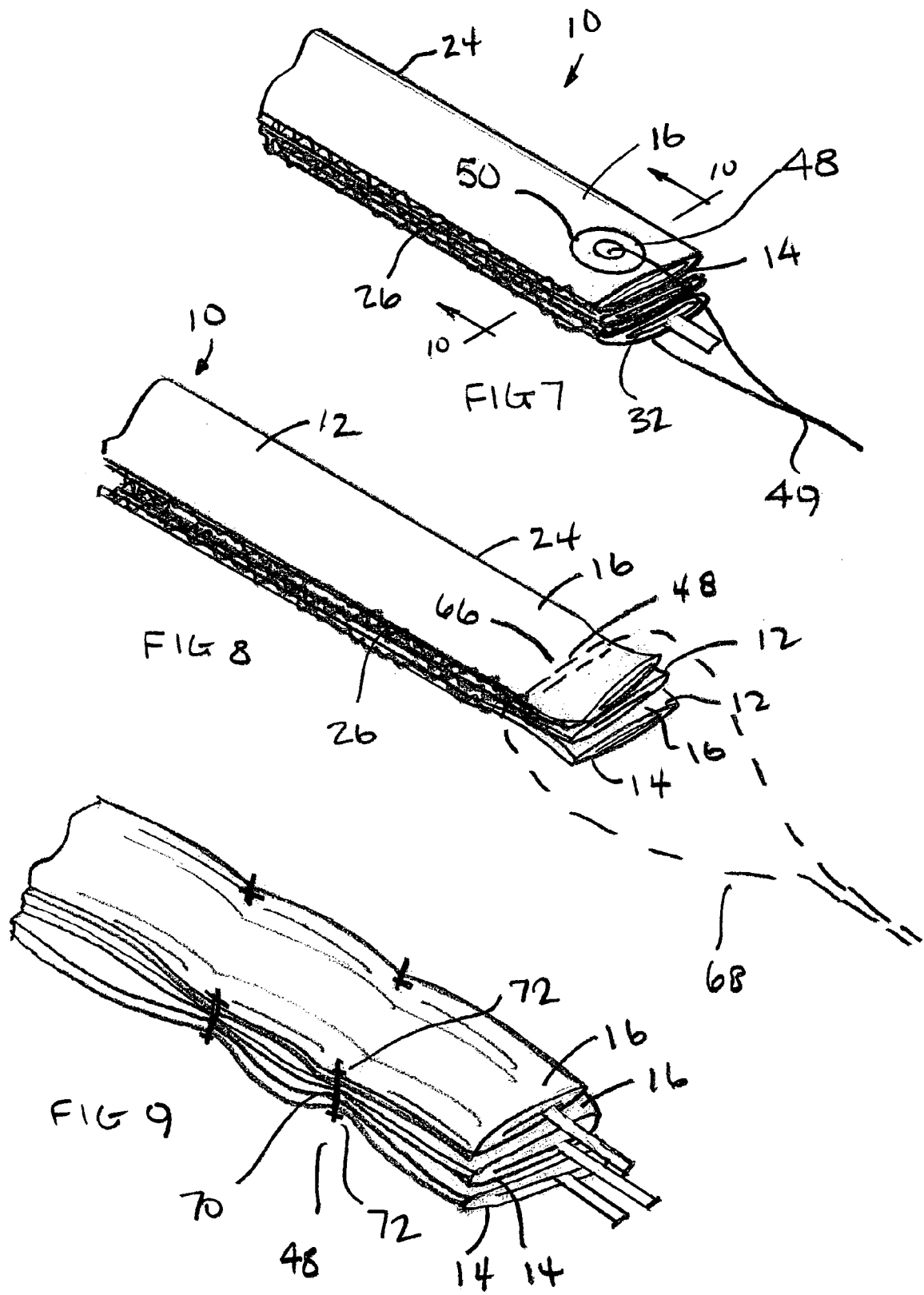

CABLE GUIDE SLEEVING STRUCTURE

RELATED APPLICATIONS

This application is based on and claims priority to U.S. Provisional Application No. 60/406,607, filed Aug. 28, 2002 and U.S. Provisional Application No. 60/476,939, filed Jun. 9, 2003.

FIELD OF THE INVENTION

This invention relates to sleeving and sleeving assemblies for encasing and protecting elongated items and especially to lengths of sleeving which may be drawn through in situ duct work for later facilitating positioning of elongated items in the duct work.

BACKGROUND OF THE INVENTION

Elongated items such as wiring bundles or optical fiber cables used for telephone, video or computer communication networks are often installed in protective ducts which may be buried underground, strung from support stanchions or positioned within building structures along with other utility and service lines. Such ducts may be, for example, extruded polymer tubes which provide substantially continuous protection to the elongated items from moisture, abrasion, impact and other environmental hazards.

Once the duct is in place, for example, underground or throughout a building structure, it is difficult to position additional cables within it, for example, to increase the capacity of the communication network or replace a failed cable. When the ducts are buried underground or positioned within the structure of a building, they are accessible only at isolated node points where the network is connected to components or splices are effected. The relative inaccessibility of the duct work often precludes any attempt to use it for additional cables. New ducts are laid or installed or the existing duct work is scrapped and replaced with new ducts having increased capacity.

The duct work through which the wiring bundles or optical fiber cables are installed may also comprise the heating and air conditioning ducts within a building. Such duct work provides a convenient means for supporting and distributing the communication lines throughout the building structure.

Placement of these communication lines within the duct work is done after the duct work is installed, either during building construction or in an established building in which the facilities are being updated or augmented. Installation of the lines within existing duct work is often a difficult task since the duct work typically does not follow a straight path, but winds its way throughout the building structure. Typically, the lines must be drawn through the duct work, sometimes under considerable tensile force.

Furthermore, items, such as the aforementioned communication lines, if installed within ventilation ducts, such as air conditioning ducts, must meet the fire safety requirements of the Plenum Rating Standard established by Underwriters Laboratories. The Plenum Rating Standard UL1995 establishes minimum requirements for both flame spreading and smoke development based upon test specifications, particularly the Surface Burning Characteristics of Building Materials and assemblies, CAN/ULC-S102, and the Standard Method of Tests For Surface Burning Characteristics of Building Materials, UL 723. According to the Plenum Rating Standard, material in a compartment handling conditioned air for circulation through a duct system shall have a flame spread rating of not more than 25 and a smoke developed rating of not more than 50 when tested according to the aforementioned specifications. By adhering to such codes, greater fire safety is achieved since the elongated items within the duct work will resist burning and smoking during a fire, and the duct work will not become a means for spreading fire and smoke throughout the building.

The insulation used with electrically conducting wire and the sheathing for optical fibers typically do not meet the requirements of the Plenum Rating Standard. This prevents positioning of such items within the air conditioning duct work of a building.

There is clearly a need for an apparatus and method for installing additional elongated items, such as optical fiber cables or wire bundles within in-situ ducts, which does not require access to the duct substantially along its length but will allow for relatively easy installation of additional elongated items with only access to terminal points of the duct. It is furthermore desirable that, at least for some applications, the protective sleeving meet or exceed the Plenum Rating Standard to afford greater protection to the elongated items from fire and allow them to be installed within the ventilation duct work of a building.

SUMMARY OF THE INVENTION

The invention concerns an elongated sleeve structure for the insertion and protection of elongated items within an outer duct. The sleeve structure includes a flexible sleeve comprised of a pair of opposed layers of woven resilient filaments. The opposed layers are comprised of warp yarns and a fill yarn common to both layers. The layers having a common seamless edge and a second edge, the layers being joined along the second edge by a knit stitch formed by interlooping of successive traverses of the fill yarn. A binder yarn may also be interlaced with the loops of the fill yarn to facilitate closure of the seam. Typically, the binder yarn has a smaller diameter than either the warp or fill yarns so as not to increase the bulk of the sleeve. The layers are of equal width and are resiliently separable from a first position in which they are in a closely spaced relationship to a spaced apart relationship in which a plurality of the elongated items may be accommodated. The layers are preferably resiliently biased to return to the first position in the absence of any the elongated items.

In a preferred embodiment, the warp and fill yarns consist essentially of polyester. Preferably, the yarns are woven in a pattern wherein the fill yarns float above two or more of the warp yarns. Such a pattern is known in weaving and includes satin, sateen and twill weaves.

Alternatively, in order to meet the plenum requirements, the warp and fill yarns may comprise aramid filaments selected from the group consisting of nylon, polyphenylene sulfide, polyvinylidene fluoride, and copolymers of ethylene and chlorotrifluoroethylene.

To facilitate drawing of elongated items through the sleeve structure, the structure further comprises a pull tape positioned between the opposed layers and extending substantially along the length of the sleeve.

To facilitate drawing the sleeving structure through a duct, an attachment piece engages an end of the sleeve. The attachment piece is adapted to receive a line for drawing the sleeve through the outer duct. Preferably the attachment piece is adapted to attach the sleeve to a plurality of other sleeves as well when the sleeves are arranged in overlying relation with one another, thus enabling a plurality of sleeves to be drawn through the duct simultaneously.

Preferably, the attachment piece comprises a grommet. The grommet comprises a tube extending through the sleeve and a flange surrounding the tube and attached to the tube at one end. The flange is positioned in engagement with one of the opposed layers forming the sleeve. A ring is positioned in engagement with another of the opposed layers. The ring is in overlying relation with the flange. The tube has a lip engaging and attaching the ring in the overlying relation with the flange.

The invention also concerns an assembly for receiving elongated items. The assembly comprises a plurality of flexible sleeves, each sleeve having a sidewall surrounding and defining a central space. Opposing portions of the sidewall of each sleeve are resiliently biased into closely spaced facing relation with one another to assume a substantially flat configuration. The opposing sidewall portions are separable into spaced relation to receive the elongated items within the central space. An attachment piece, such as a grommet, extends through each of the sidewalls and joins the sleeves to one another in overlying relation.

The invention also encompasses a method of positioning and protecting elongated items within a duct. The method comprises the steps of:

(A) providing a flexible sleeve comprised of a pair of opposed layers of woven resilient filaments comprised of warp yarns and a fill yarn common to both layers, the layers having a common seamless edge and a second edge, the layers being joined along the second edge by a knit stitch formed by interlooping of successive traverses of the fill yarn, the layers being of equal width and being resiliently separable from a first position in which they are in a closely spaced relationship to a spaced apart relationship in which a plurality of the elongated items may be accommodated, the layers being biased to return to the first position in the absence of any of the elongated items, a pull tape being positioned between the layers and extending lengthwise along the sleeve;

(B) fixing an attachment device on an end of the sleeve;

(C) drawing a line through the duct;

(D) attaching one end of the line to the attachment device;

(E) drawing the sleeve through the duct using the line;

(F) severing the sleeve to remove the attachment device;

(G) attaching the elongated item to one end of the pull tape; and (H) drawing the elongated item through the sleeve using the pull tape.

BRIEF DESCRIPTION OF THE DRAWINGS

FIGS. 7–9 are perspective views of sleeve structure assemblies according to the invention.

DETAILED DESCRIPTION OF THE PREFERRED EMBODIMENTS

Figure 1:
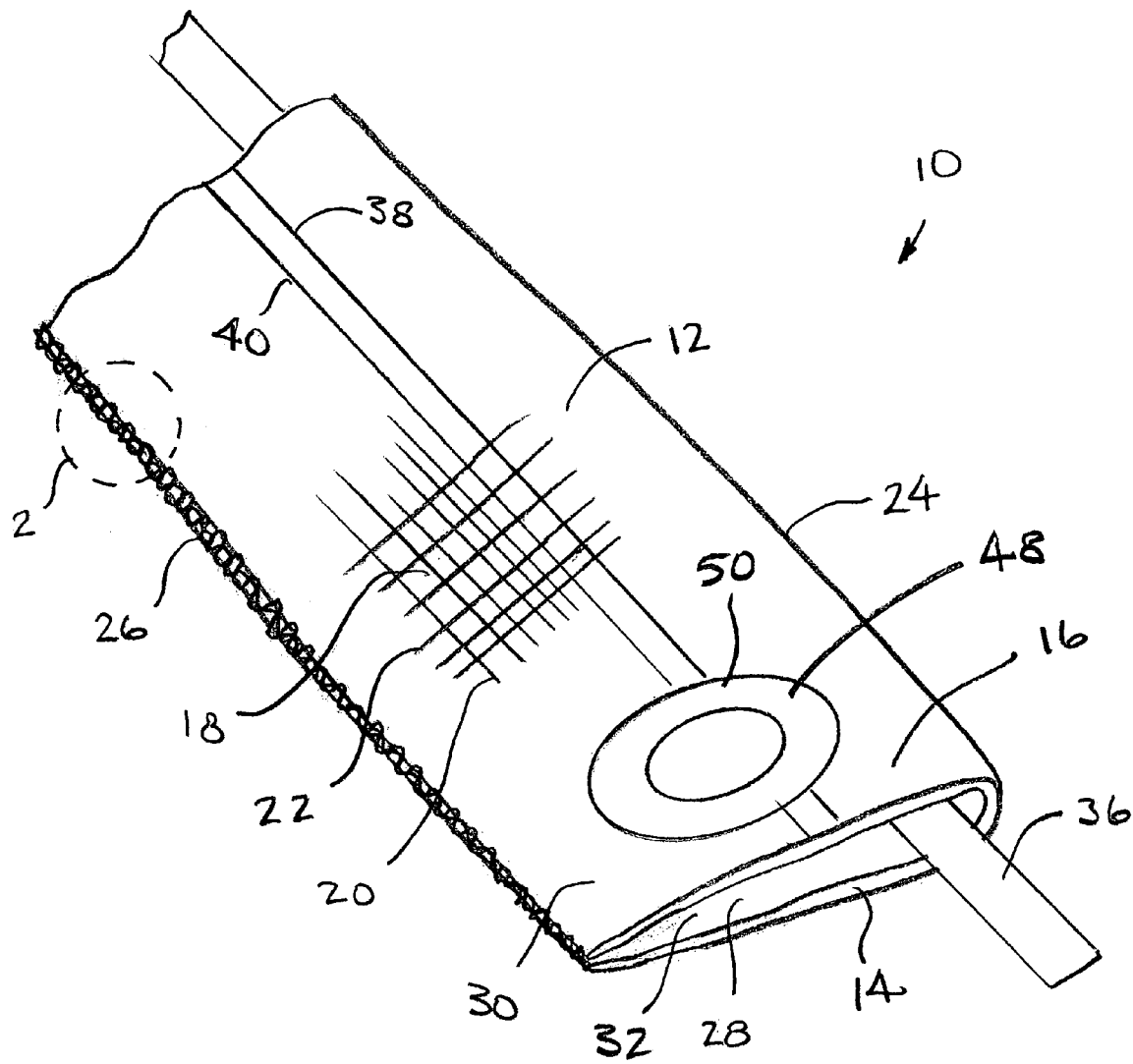
FIG. 1 is a perspective view of a sleeve structure according to the invention.
Figure 2:
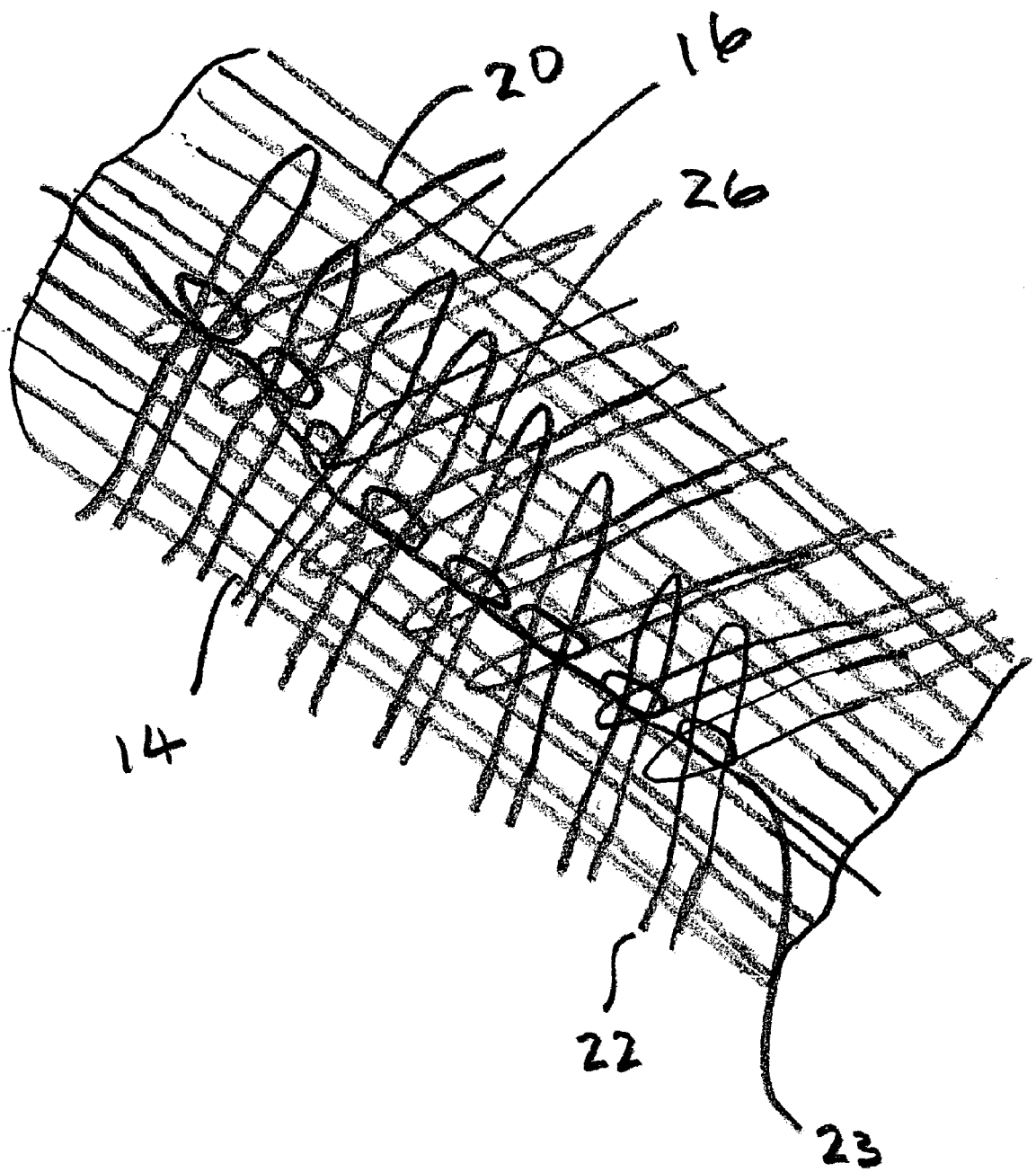
FIG. 2 is a detailed view on an enlarged scale of the portion of the sleeve structure within circle 2 in FIG. 1.
Figure 3:
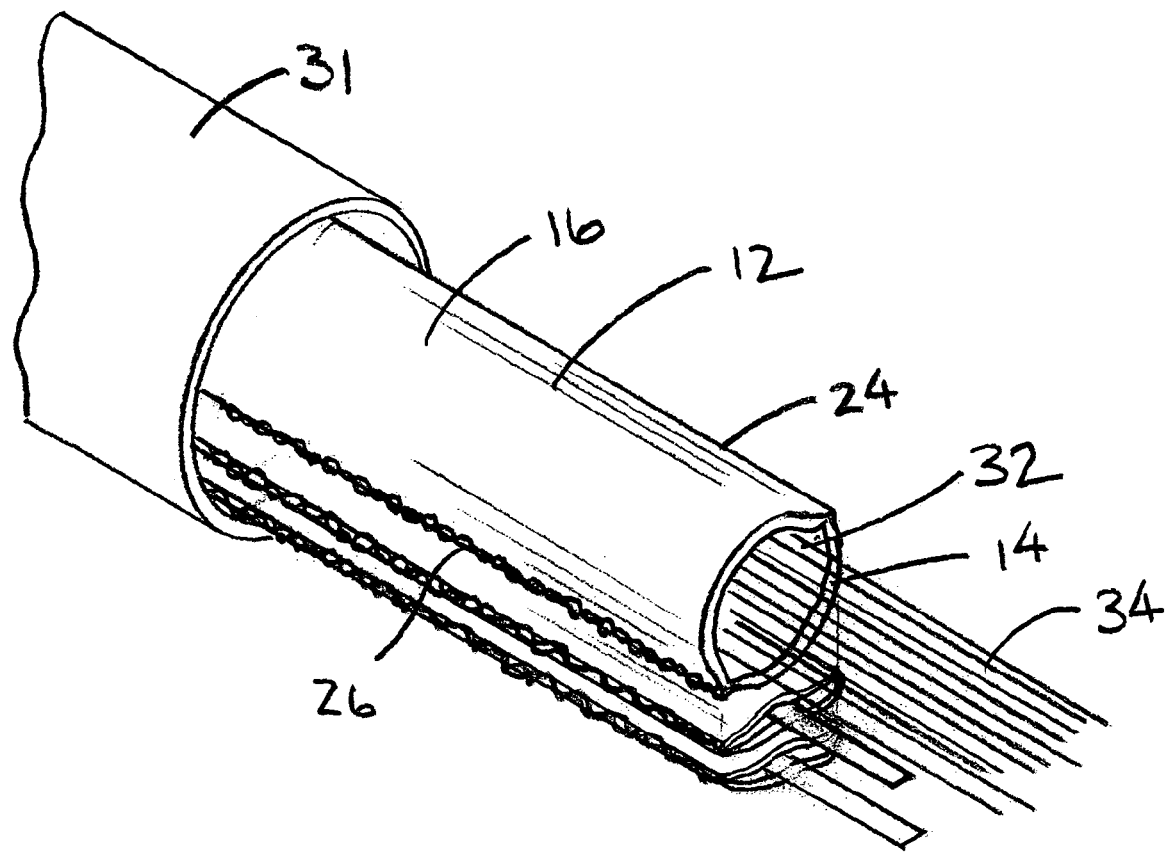
FIG. 3 is a perspective view of a plurality of sleeves within a conduit.

FIG. 1 shows an elongated sleeve structure 10 according to the invention. Sleeve structure 10 comprises a flexible sleeve 12 comprising opposed layers 14 and 16 of woven resilient filaments 18. Filaments 18 comprise warp yarns 20 and fill yarns 22, the fill yarns being common to both layers 14 and 16. The opposed layers 14 and 16 have a common seamless edge 24 and are joined to one another along a second edge 26 formed, as best shown in detail in FIG. 2, by interlooping successive traverses of the fill yarn 22 with one another. In some cases, depending upon the mode of manufacture, a binder yarn 23 is used to facilitate closure of the second edge 26. The binder yarn 23 traverses lengthwise along the edge and loops around pairs of fill yarn loops 22. Preferably, as shown in FIG. 1, the opposed layers 14 and 16 are of equal width and comprise sidewall portions 28 and 30 surrounding and defining a central space 32. The opposed layers 14 and 16 are nominally in a substantially flat, closely spaced relationship. This allows them to be easily drawn through a duct 31 as depicted in FIG. 3. As further shown in that Figure, opposed layers 14 and 16 are resiliently separable into a spaced apart relationship, in which relationship a plurality of elongated items 34, such as optical fiber cables or wire bundles may be accommodated within the central space 32. Preferably, the opposed layers 14 and 16 are resiliently biased to return to the substantially flat configuration in the absence of the elongated items 34.

In one preferred embodiment, both the warp and fill yarns 20 and 22 consist essentially of polyester and are interwoven using a weave pattern characterized by "floats" of either warp or fill yarns on the surface of the woven layers. A yarn is said to "float" when it is not interwoven alternately with each cross yarn but skips two or more cross yarns before being interwoven. Weaves using floats include twill, satin and sateen weaves. In twill and satin weaves, the warp yarns float over the fill yarns, whereas in the sateen weave, the fill yarns float over the warp yarns. Satin weaves are characterized by having longer floats than twills. In general twill, satin and sateen weaves are favored because they provide a durable fabric which resists wear and abrasion and provides a smooth surface with low friction. The floats are preferably positioned on the inner surface of the sleeves. This allows elongated items 34 to be drawn more easily through the central space 32 when such items are being installed within the sleeve structure. The flat configuration of the sleeve structure 10 also provides advantage when it is drawn through a duct, as it maintains a low profile, allowing the sleeve 12 to more readily traverse crowded ducts and sharp curves in comparison with a sleeve that is normally biased into an open configuration.

In a particular embodiment using polyester warp and fill yarns in one of the weaves mentioned above, the warp yarns are monofilaments having a diameter of about 0.25 mm, the fill yarns are also monofilaments having a diameter of about 0.20 mm, and the sleeve 12 has a weave density of 20 to 35 dents per inch by 20 to 35 picks per inch.

Alternately, the warp and fill yarns 20 and 22 may comprise materials such as nylon, polypropylene as well as other polymers. To meet the requirements necessary to achieve the Plenum Rating Standard allowing the sleeve structure 10 to be installed in building ventilation duct work, filaments having significant resistance to heat, fire and the propensity not to give off smoke when burning are useful.

In a plenum rated embodiment of sleeve structure 10, the warp filaments 20 are preferably monofilaments comprising polyphenylene sulfide. If higher strength is required, then the warp filaments 20 may comprise monofilament aramids such as KEVLAR®, either alone or in combination with the polyphenylene sulfide monofilaments. Monofilaments are preferred because they provide greater axial stiffness to the sleeve and thus will reduce its tendency to stretch when subjected to tensile forces.

In fire-resistant sleeves, the fill filaments 22 preferably comprise polyphenylene sulfide, either as monofilaments or multi-filament yarns. When used with warp filaments 20 of polyphenylene sulfide or an aramid as described above, the combination is expected to yield a non-halogenated sleeve which meets the desired plenum rating. Halogenated materials, such as fluorinated polymers, have been effective in the past in achieving the desired plenum rating, however, such compounds are disadvantageous because they produce noxious gases when they burn.

In another embodiment, the fill yarns 22 comprise fire resistant aramids such as NOMEX® combined with warp yarns 20 of polyphenylene sulfide. Alternately, halogenated compounds such as polyvinylidene fluoride (KYNAR®) and copolymers of ethylene and chlorotrifluoroethylene (HALAR®) may be used for the fill yarns 22. Multi-filament yarns are advantageous for the fill yarns 20 because they are more flexible and provide generally better coverage, yielding smaller interstice size for the sleeve structure 10.

As shown in FIG. 1, sleeve assembly 10 also includes a pull tape 36 arranged within the central space 32 between the opposed layers 14 and 16. The pull tape 36 extends the length of the sleeve structure 10 and facilitates the installation of elongated items. Once the sleeve structure is positioned within a duct, the elongated item is attached to one end of the pull tape 36, and the other end is drawn through the sleeve, the elongated item replacing the pull tape within the sleeve structure 10. Preferably, pull tape 36 has a flat cross-sectional profile to reduce the bulk of the sleeve structure 10. The pull tape 36 may be woven, braided or otherwise interlaced from high strength fibers such as aramids which will withstand significant tensile loads during the pulling operation.

When multiple sleeve assemblies 10 are used in a single duct to protect communication lines, it is desirable to be able to readily distinguish one sleeve structure from another. This is advantageous, for example, so as to unambiguously be able to identify which pull tape is attached to an elongated item, and thus, which pull tape to draw through a sleeve. Identification of the sleeves is effected by using a trace yarn 38 interwoven as a warp yarn over the length of the sleeve structure 10. Trace yarn 38 has a color which contrasts with the colors comprising the warp and fill yarns 20 and 22 and, thus, allows the sleeve assemblies 10 to be color coded and readily distinguishable one from another by merely observing the colors of the trace yarns 38 at either end of the sleeve structure 10.

It may also be desired to be able to detect the presence or absence of a sleeve structure 10 while it is within a duct and not visually observable. This capability is advantageous to check the continuity of a sleeve structure for example. To this end, a detection filament 40 may be woven along with the warp yarns 20 lengthwise along the sleeve structure 10. Detection filament 40 comprises an electrically conducting wire which allows the sleeve structure 10 to be detected by inductive or radio-frequency techniques. This is especially useful for ducts which are buried as the detection means, for example, an electromagnetic disturbance, passes easily through the ground between the detection wire 40 and a detection apparatus, such as a radio receiver, to provide immediate indication of the presence or absence of the sleeve structure 10.

Figure 4:
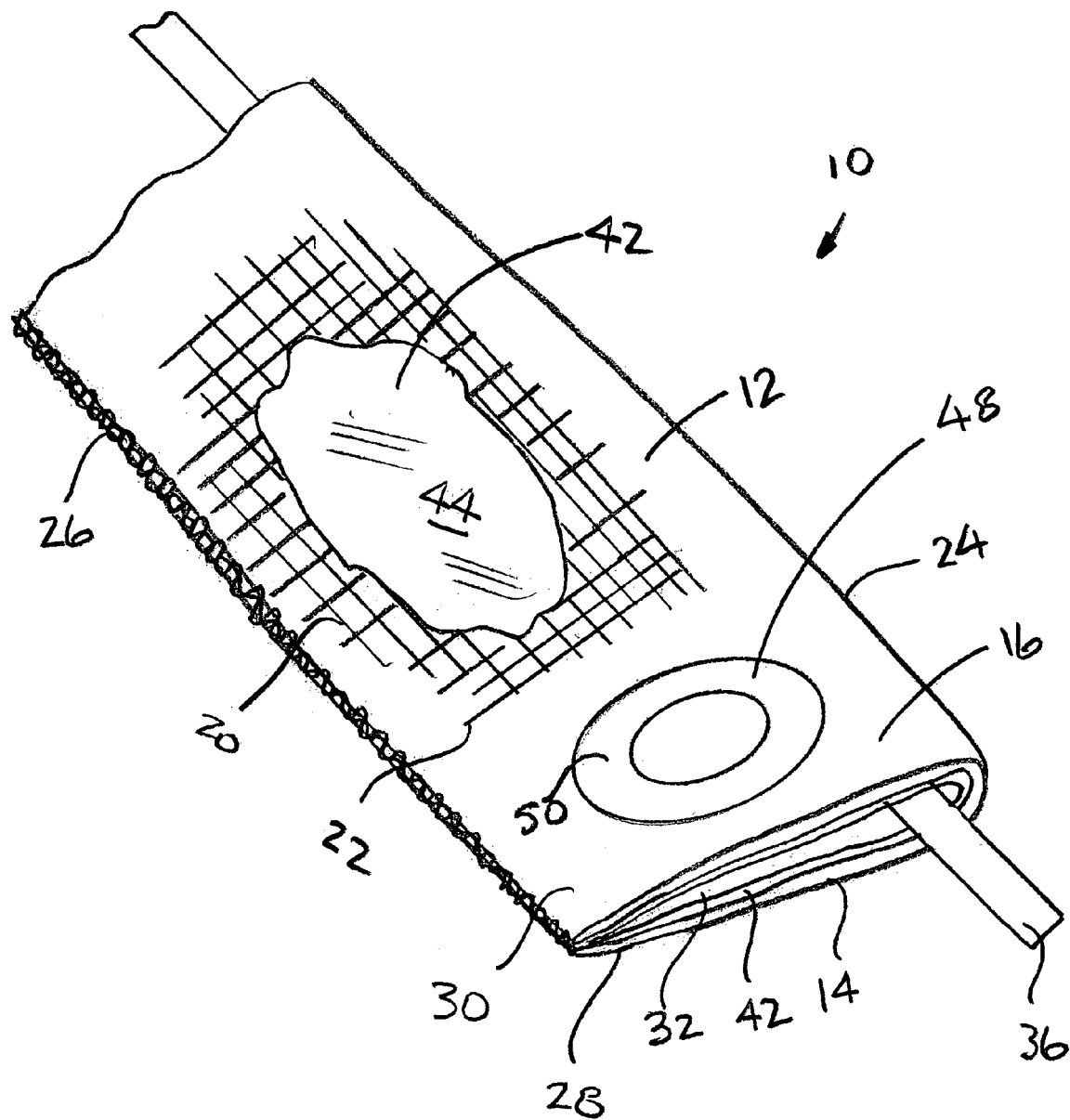
FIGS. 4–6 are perspective views of various embodiments of a sleeve structure according to the invention.
Figure 5:
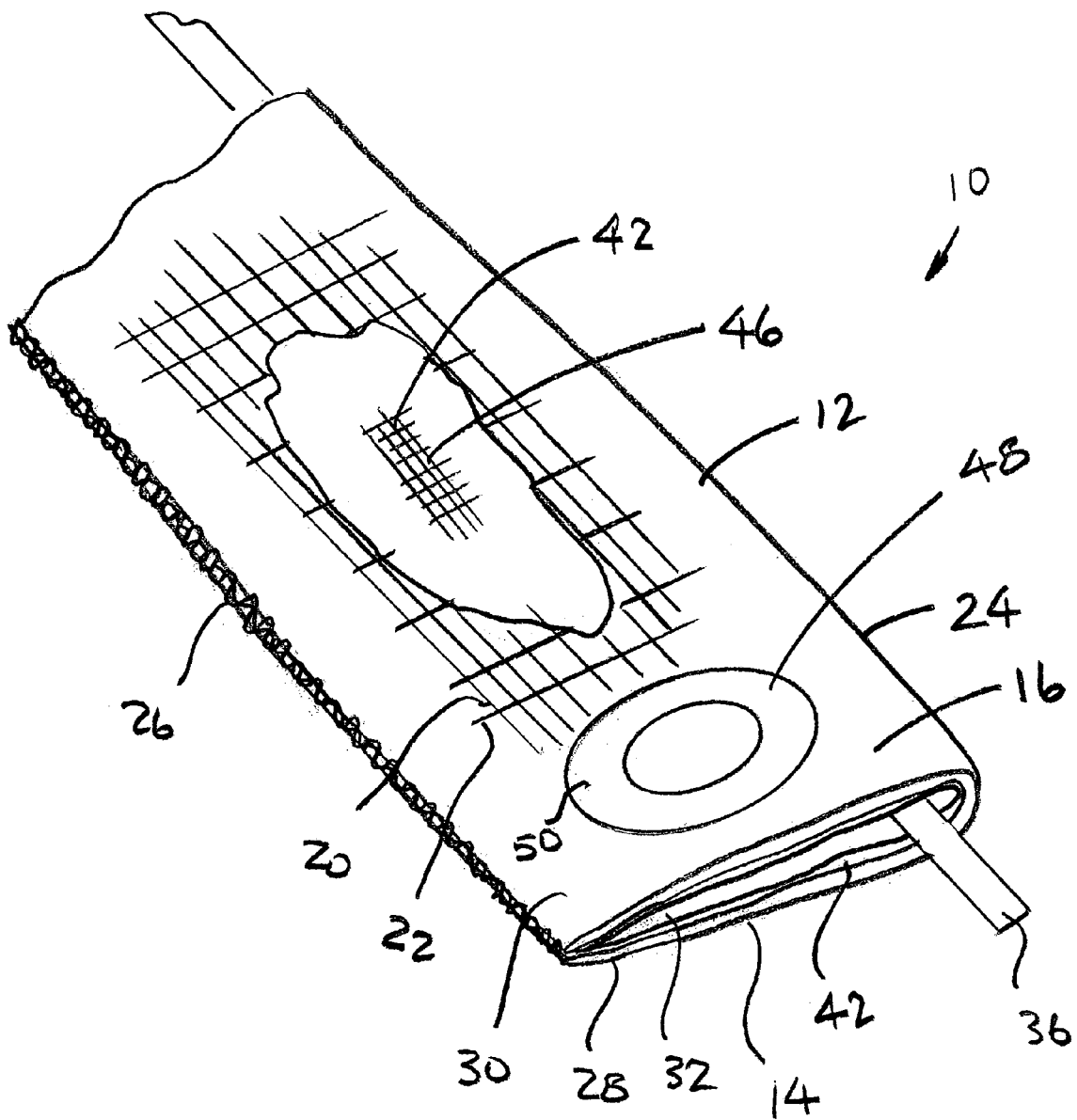

If the elongated items positioned within central space 32 carry electrical currents, it may be desirable to shield these items from electromagnetic interference (EMI). The items themselves may be a source of EMI adversely affecting other electrical current carriers, in which case it is desirable to isolate them. As shown in FIG. 4, the sleeve structure 10 may serve as a shield/isolator of EMI by the incorporation of a conducting layer 42 substantially surrounding the central space 32. Conducting layer 42 may comprise a layer of metal foil 44 (preferably aluminum) or, as illustrated in FIG. 5, may comprise a plurality of interlaced conductors 46. Conductors 46 may be interwoven with the warp and fill yarns 20 and 22 or take the form of a distinct layer attached to the sleeve structure 10. The conductors 46 may, for example, comprise selected warp and fill yarns coated with a conductor, such as silver or copper, and be in electrical contact substantially along the length and width of the sleeve structure 10. Upon grounding of the conducting layer 42, it will serve to shield or isolate the items within the sleeve structure 10 from EMI.

Figure 6:
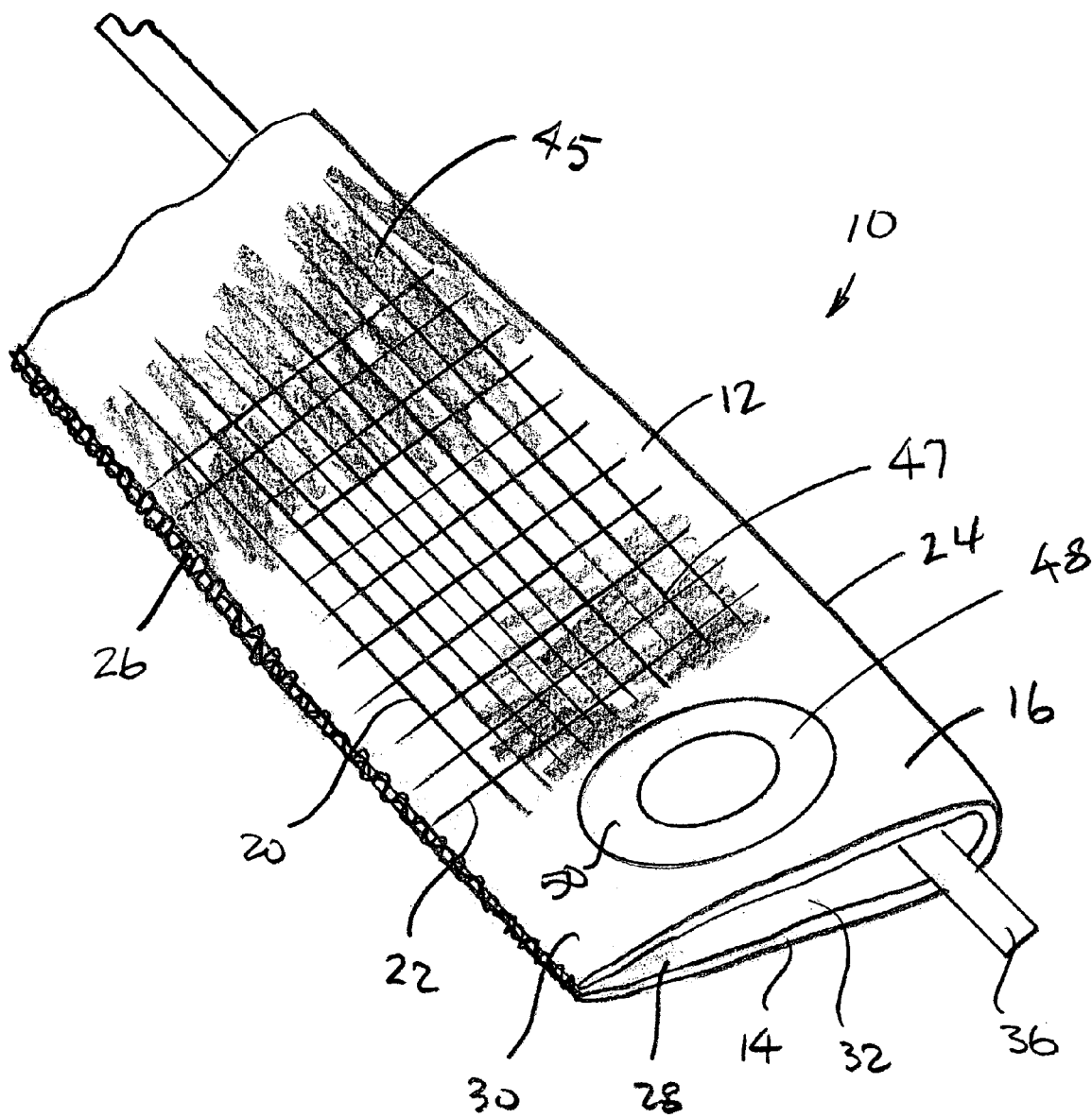

It may be desired to inflate sleeve structure 10 with a compressed gas or other fluid. Inflation of the sleeve structure may, for example, facilitate its passage through a duct. To enable the sleeve structure 10 to be inflated, it is advantageous, as shown in FIG. 6, to coat the sleeve 12 with a flexible polymer coating 45 which seals the interstices formed when the sleeve structure 10 is woven. Other coatings 47, utilizing zinc compounds, may also be employed on the sleeve 12, for example, to prevent rot, mildew and other decay.

As shown in FIG. 1, the sleeve structure includes an attachment piece 48. Attachment piece 48 may take one of several embodiments and serves to attach multiple sleeves 12 to one another in overlying relation to form an assembly as illustrated in FIGS. 7–9. As shown in FIG. 7, the attachment piece 48 may also provide a location where a line 49 may be attached to draw one or more sleeve structures 10 through a duct.

Figure 10:
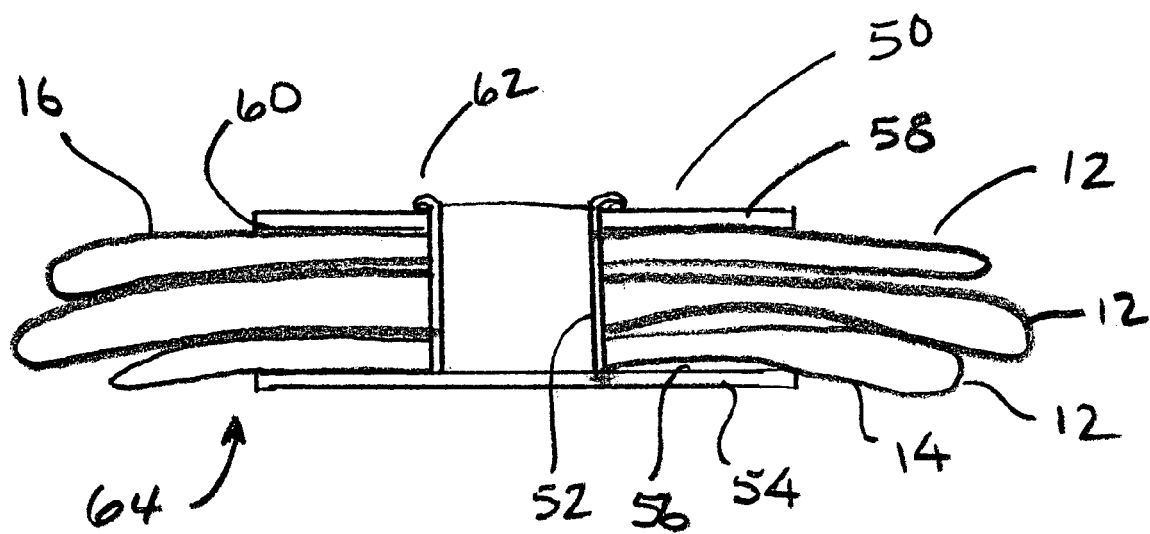
FIG. 10 is a cross-sectional view taken at line 10—10 of FIG. 7.

As shown in FIGS. 1 and 7, in a preferred embodiment of the sleeve structure 10, the attachment piece 48 comprises a grommet 50 located at one end of the sleeve 12. As shown in cross section in FIG. 10, grommet 50 comprises a tube 52 that extends through one or more sleeves 12. A flange 54 is attached to one end of the tube 52. The flange 54 provides a surface 56 engageable with an opposed layer 14 of one of the sleeves 12 to retain the grommet to the sleeve. The grommet also comprises a ring 58 which receives tube 52 and is positionable in overlying relation with flange 54. Ring 58 provides a surface 60 engageable with another opposed layer 16, either on the same sleeve 12 or on another sleeve 12, in overlying relation with the first named sleeve to retain the grommet to the sleeve or assembly of sleeves. The ring 58 is retained by a lip 62 formed by outwardly reverse folding the tube in a cold-working process. Grommet 50 may be used on a single sleeve structure 10 as shown in FIG. 1, or as shown in FIG. 10, on a sleeve structure assembly 64 to attach a plurality of sleeve structures to one another in overlying relationship. The grommet 50 enables single or multiple sleeve structures 10 to be drawn through a duct. After the sleeve structures 10 are positioned within the duct, the grommet 50 is removed, preferably by severing the sleeve structure or structures at or near the grommet.

FIG. 8 shows another attachment piece 48 in the form of sutures 66 that are sewn or stitched through the opposed layers 14 and 16 of multiple sleeves 12 to join them to one another for simultaneous drawing of the assembly through a duct. The sutures 66 provide a strong attachment between the sleeve structures 10 which also provides a joint for receiving a line 68 (shown in dotted line) looped between the overlying sleeve structures for drawing them through a conduit.

FIG. 9 shows another attachment piece 48 in the form of frangible posts 70 and cross pieces 72. Posts 70 extend through the opposed layers 14 and 16 of multiple sleeve structures 10 connecting them to one another. The cross pieces 72 are positioned at either end of the posts 70 and engage the outermost sleeve structures to retain the sleeve structures 10 in overlying relation while the assembly of sleeve structures is being drawn through a duct. The posts and cross pieces are designed to be strong enough to hold the sleeve structures together during the draw through the duct, but are frangible so as to separate and release the sleeve structures when subjected to a tensile load as occurs when an elongated item is pulled through one of the central spaces 32 of any of the sleeves 12. Preferably, the posts and cross pieces are formed from a polymer such as nylon, polypropylene or polyethylene. The frangible aspect may reside in either the post or the cross piece and may be effected by, for example, incorporating a narrowed cross section or a notch which will act as a failure initiation point upon application of a tensile load.

The invention also concerns a method of positioning elongated items within a duct using the sleeve structure 10 according to the invention. In the method according to the invention, a sleeve structure 10 or an assembly of sleeve structures is provided. An attachment device, for example, the grommet 50, is fixed onto an end of the sleeve structure or sleeve assembly. A line is drawn through the duct and one end of the line is attached to the sleeve structure or assembly using the attachment device mounted on its end. The sleeve structure or assembly is then drawn through the duct using the line. Upon completion of the draw, the sleeve structure or assembly is severed to remove the attachment device. The elongated item to be positioned within the duct is attached to one end of a pull tape in the central space of one of the sleeves, and the elongated item is drawn through the sleeve using the pull tape.

Sleeve structures and assemblies according to the invention, when used to position elongated items within duct work, provide several advantages. Due to their flat configuration, the sleeve structures and assemblies pass easily through a conduit, even one which is congested with other cables, lines and the like. Thus, the sleeve structures according to the invention may be used to augment a pre-existing network or create a network from scratch. The sleeve structures prevent tangling and spiraling of the elongated items, confining them to a predetermined size envelope to afford maximum usage of the limited space available within the duct and allowing greater packing densities. The sleeve structures present a smooth, durable surface to the elongated items by virtue of the weave which uses floats as found in twill, satin and sateen weaves. This reduces the friction between the sleeve structure and the elongated item during a pull and allows for longer pulls to be effected using lower pull forces with less chance of failure of a pull tape or elongated item.

What is claimed is:

1. An elongated sleeve structure for the insertion and protection of elongated items within an outer duct, said sleeve structure comprising a flexible sleeve comprised of a pair of opposed layers of woven resilient filaments comprised of warp yarns and a fill yarn common to both layers, said layers having a common seamless edge and a second edge, the layers being joined along the second edge by a knit stitch formed by interlooping of successive traverses of said fill yarn, said layers being of equal width and being resiliently separable from a first position in which they are in a closely spaced relationship to a spaced apart relationship in which a plurality of said elongated items may be accommodated, said layers being resiliently biased to return to said first position in the absence of any said elongated items.

2. An elongated sleeve structure according to claim 1, wherein said warp and fill yarns consist essentially of polyester.

3. An elongated sleeve structure according to claim 2, wherein said warp yarns comprise monofilaments having a diameter of about 0.25 mm.

4. An elongated sleeve structure according to claim 3, wherein said fill yarns comprise monofilaments having a diameter of about 0.20 mm.

5. An elongated sleeve structure according to claim 4, wherein said sleeve has a weave density of 20 to 35 dents per inch by 20 to 35 picks per inch.

6. An elongated sleeve structure according to claim 2, wherein said warp and fill yarns are woven in a pattern selected from the group consisting of satin, sateen and twill weaves.

7. An elongated sleeve structure according to claim 1, wherein one of said warp and said fill yarns comprise polyester.

8. An elongated sleeve structure according to claim 7, wherein one of said warp and said fill yarns further comprise nylon.

9. An elongated sleeve structure according to claim 7, wherein one of said warp and said fill yarns further comprise polypropylene.

10. An elongated sleeve structure according to claim 1, wherein said warp and fill yarns comprise aramid filaments selected from the group consisting of nylon, polyphenylene sulfide, polyvinylidene fluoride, and copolymers of ethylene and chlorotrifluoroethylene.

11. An elongated sleeve structure according to claim 1, wherein said warp and fill yarns have substantially the same color as one another, an additional filamentary member being interwoven with said warp yarns substantially lengthwise along said sleeve and having a color contrasting with said warp and fill yarns.

12. An elongated sleeve structure according to claim 1, further comprising an electrically conducting layer substantially coextensive with said sleeve.

13. An elongated sleeve structure according to claim 12, wherein said electrically conducting layer comprises aluminum foil.

14. An elongated sleeve structure according to claim 12, wherein said electrically conducting layer comprises a plurality of interlaced conductors.

15. An elongated sleeve structure according to claim 12, wherein said electrically conducting layer is positioned between said pair of opposed layers.

16. An elongated sleeve structure according to claim 12, wherein said electrically conducting layer comprises electrically conducting filaments interwoven with said warp and said fill yarns.

17. An elongated sleeve structure according to claim 1, further comprising a pull tape positioned between said opposed layers and extending substantially along the length of said sleeve.

18. An elongated sleeve structure according to claim 17, wherein said pull tape has a substantially flat cross-sectional shape.

19. An elongated sleeve structure according to claim 17, wherein said pull tape is formed of interlaced filamentary members.

20. An elongated sleeve structure according to claim 19, wherein said interlaced filamentary members comprise aramid fibers.

21. An elongated sleeve structure according to claim 1, further comprising a flexible polymer coating positioned on said sleeve, said coating providing a substantially fluid-tight seal enabling inflation of said sleeve.

22. An elongated sleeve structure according to claim 1, further comprising a binder yarn extending lengthwise along said second edge, said binder yarn having a plurality of loops surrounding said successive traverses of said fill yarns to facilitate closure of said second edge.

23. An elongated sleeve structure according to claim 1, further comprising an attachment piece engaging said sleeve near an end thereof, said attachment piece being adapted to receive a line for drawing said sleeve through said outer duct.

24. An elongated sleeve structure according to claim 23, wherein said attachment piece is adapted to attach said sleeve to a plurality of other said sleeves when said sleeves are arranged in overlying relation with one another.

25. An elongated sleeve structure according to claim 23, wherein said attachment piece comprises a grommet, said grommet comprising: a tube extending through said sleeve; a flange attached to one end of said tube, said flange being positioned in engagement with one of said opposed layers; and a ring positioned in engagement with another of said opposed layers, said ring being in overlying relation with said flange, said tube having a lip engaging and attaching said ring in said overlying relation with said flange.

26. An elongated sleeve structure according to claim 25, wherein said lip is formed by cold-working said tube and forming an outward reverse fold therein.

27. An elongated sleeve structure according to claim 25, further comprising a plurality of said sleeves positioned in overlying relation with one another in a stack, said tube extending through said plurality of sleeves and attaching said sleeves to one another, said flange engaging one of said sleeves uppermost in said stack, said ring engaging another of said sleeves positioned lowermost in said stack.

28. An elongated sleeve according to claim 24, wherein said attachment piece comprises a suture extending through said opposed layers into engagement with at least another set of opposed layers of another of said sleeves thereby attaching said sleeves to one another.

29. An elongated sleeve structure according to claim 24, wherein said attachment piece comprises a post extending through said opposed layers of said sleeve and through other opposed layers of another of said sleeves, a pair of cross pieces being attached at opposite ends of said post, said cross pieces engaging said opposed layers and retaining said sleeves to one another.

30. An elongated sleeve structure according to claim 29, further comprising a plurality of said posts and said cross pieces positioned in spaced relation lengthwise along said plurality of sleeves and joining said sleeves to one another, one of said posts and said cross pieces in each of said attachment pieces being frangible upon the application of a force separating said sleeves one from another.

31. An elongated sleeve structure according to claim 2, wherein said filaments are woven in a pattern wherein said fill yarns float above two or more of said warp yarns.

32. An elongated sleeve for receiving elongated items, said sleeve comprising a flexible sidewall surrounding and defining a central space, said sidewall comprising polyester warp yarns interwoven with polyester fill yarns in a weave pattern selected from the group consisting of twill, satin and sateen weaves, opposing portions of said sidewall being in facing relation with one another to assume a substantially flat configuration, said opposing sidewall portions being separable into spaced apart relation to receive said elongated items within said central space.

33. A sleeve according to claim 32, wherein said opposing sidewall portions are resiliently expandable into said spaced apart relation.

34. A sleeve according to claim 32, wherein said warp yarns comprise monofilaments having a diameter of about 0.25 mm.

35. A sleeve according to claim 34, wherein said fill yarns comprise monofilaments having a diameter of about 0.20 mm.

36. A sleeve according to claim 35, wherein said sidewall has a weave density of about 20 to 35 dents inch by about 20 to 35 picks per inch.

37. A sleeve according to claim 32, further comprising an electrically conducting layer positioned on said sidewall and surrounding said central space.

38. A sleeve according to claim 37, wherein said electrically conducting layer comprises aluminum foil.

39. A sleeve according to claim 37, wherein said electrically conducting layer comprises a plurality of interlaced metal wires.

40. A sleeve according to claim 37, wherein said electrically conducting layer is positioned between said central space and said sidewall.

41. A sleeve according to claim 32, further including an electrically conducting wire interlaced with said filamentary members lengthwise along said sidewall.

42. A sleeve according to claim 32, further comprising a seam extending lengthwise along said sidewall, said seam being closed by interknitted loops of said fill elements comprising said opposing sidewall portions with one another.

43. A sleeve according to claim 42, further comprising a reverse fold positioned in said sidewall opposite to said seam.

44. A sleeve according to claim 32, further comprising a pull tape positioned within said central space and extending substantially along the length of said sidewall.

45. A sleeve according to claim 44, wherein said pull tape has a substantially flat cross-sectional shape.

46. A sleeve according to claim 44, wherein said pull tape is formed of interlaced filamentary members.

47. A sleeve according to claim 46, wherein said interlaced filamentary members comprise aramid fibers.

48. A sleeve according to claim 32, further comprising an attachment piece engaging said sidewall, said attachment piece being adapted to attach said sleeve to a plurality of other said sleeves when said sleeves are arranged in overlying relation with one another, said attachment piece engaging sidewalls of said plurality of other sleeves.

49. A sleeve according to claim 48, wherein said attachment piece comprises: a first surface positioned in engagement with a sidewall of a first one of said sleeves; a second surface positioned in engagement with a sidewall of a second one of one of said sleeves; and a linking element extending through said sidewalls of said first and second sleeves and said sleeves positioned between said first and second sleeves, said linking element being attached to said first and second surfaces, said first and second surfaces being in substantially overlying relation with one another, said sidewalls being captured between said first and second surfaces.

50. A sleeve according to claim 49, wherein said attachment piece comprises a grommet, said grommet comprising: a tube extending through said sidewalls, said tube comprising said linking element; a flange attached to one end of said tube, said flange being positioned in engagement with said one sidewall and comprising said first surface; and a ring positioned in engagement with said other sidewall, said ring being in overlying relation with said flange and comprising said second surface, said tube having a lip engaging and attaching said ring in said overlying relation with said flange.

51. A sleeve according to claim 50, wherein said lip is formed by cold-working said tube and forming an outward reverse fold therein.

52. A sleeve according to claim 48, wherein said attachment piece comprises a suture positioned within said sidewall and extending therethrough into engagement with at least another sidewall of another of said sleeves thereby attaching said sleeves to one another.

53. A sleeve according to claim 48, wherein said attachment piece comprises a post extending through said sidewall and through another sidewall of another of said sleeves, a pair of cross pieces being attached at opposite ends of said post, said cross pieces engaging said sidewalls and retaining them to one another.

54. A sleeve according to claim 53, further comprising a plurality of said posts and said cross pieces positioned in spaced relation lengthwise along said sidewalls of said plurality of sleeves and joining said sidewalls to one another, one of said posts and said cross pieces in each of said attachment pieces being frangible upon the application of a force separating said sleeves one from another.

55. An assembly for receiving elongated items, said assembly comprising: a plurality of flexible sleeves, each said sleeve having a sidewall surrounding and defining a central space, opposing portions of said sidewall of each said sleeve being resiliently biased into facing relation with one another to assume a substantially flat configuration, said opposing sidewall portions being separable into spaced relation to receive said elongated items within said central space; and an attachment piece extending through each of said sidewalls and attaching said sleeves to one another in overlying relation.

56. An assembly according to claim 55, wherein said attachment piece comprises: a first surface positioned in engagement with a sidewall of a first one of said sleeves; a second surface positioned in engagement with a sidewall of a second one of one of said sleeves; and a linking element extending through said sidewalls of said first and second sleeves and said sleeves positioned between said first and second sleeves, said linking element being attached to said first and second surfaces, said first and second surfaces being in substantially overlying relation with one another, said sidewalls being captured between said first and second surfaces.

57. An assembly according to claim 56, wherein said attachment piece comprises a grommet, said grommet comprising: a tube extending through said sidewalls, said tube comprising said linking element; a flange attached to one end of said tube, said flange being positioned in engagement with said one sidewall and comprising said first surface; and a ring positioned in engagement with said other sidewall, said ring being in overlying relation with said flange and comprising said second surface, said tube having a lip engaging and attaching said ring in said overlying relation with said flange.

58. An assembly according to claim 55, wherein said attachment piece comprises a suture extending through said sidewalls of said sleeves and thereby sewing said sleeves to one another.

59. An assembly according to claim 55, wherein said attachment piece comprises: a post extending through said sidewalls of said sleeves; a pair of cross pieces attached at opposite ends of said post; one of said cross pieces engaging a sidewall of a first one of said sleeves; and another of said cross pieces engaging a sidewall of a second one of one of said sleeves, said post and said cross pieces holding said sleeves in said overlying relation.

60. An assembly according to claim 59, further comprising a plurality of said posts and said cross pieces positioned in spaced relation lengthwise along said sidewalls of said plurality of sleeves and joining said sidewalls to one another, one of said posts and said cross pieces in each of said attachment pieces being frangible upon the application of a force separating said sleeves one from another.

61. An assembly according to claim 55, wherein said sidewall of at least one of said sleeves comprises a plurality of interlaced filamentary members.

62. An assembly according to claim 61, wherein said filamentary members comprise warp and fill yarns interlaced by weaving.

63. An assembly according to claim 62, wherein said warp filaments are oriented lengthwise along said sidewall.

64. An assembly according to claim 62, wherein said filamentary members are woven in a pattern selected from the group consisting of satin, sateen and twill weaves.

65. An assembly according to claim 62, wherein said warp and fill yarns comprise polyester.

66. An assembly according to claim 62, wherein said filamentary members comprise aramid filaments selected from the group consisting of nylon, polyphenylene sulfide, polyvinylidene fluoride, and copolymers of ethylene and chlorotrifluoroethylene.

67. An assembly according to claim 55, further comprising a plurality of pull tapes, each one of said pull tapes being positioned within said central space of one of said sleeves, respectively, and extending substantially along the length thereof.

68. An assembly according to claim 67, wherein each of said pull tapes has a substantially flat cross-sectional shape.

69. A sleeve according to claim 67, wherein each of said pull tapes is formed of interlaced filamentary members.

70. A method of positioning and protecting elongated items within a duct, said method comprising the steps of: providing a flexible sleeve comprised of a pair of opposed layers of woven resilient filaments comprised of warp yarns and a fill yarn common to both layers, said layers having a common seamless edge and a second edge, the layers being joined along the second edge by a knit stitch formed by interlooping of successive traverses of said fill yarn, said layers being of equal width and being resiliently separable from a first position in which they are in a closely spaced relationship to a spaced apart relationship in which a plurality of said elongated items may be accommodated, said layers being biased to return to said first position in the absence of any said elongated items, a pull tape being positioned between said layers and extending lengthwise along said sleeve; fixing an attachment device on an end of said sleeve; drawing a line through said duct; attaching one end of said line to said attachment device; drawing said sleeve through said duct using said line; severing said sleeve to remove said attachment device; attaching said elongated item to one end of said pull tape; and drawing said elongated item through said sleeve using said pull tape.

71. An assembly according to claim 55, wherein said attachment piece extends through said sidewalls along at least one edge of said sleeves thereby attaching said sleeves to one another.

\* \* \* \* \*